United States Patent [19]

Quintus et al.

[11] Patent Number: 5,172,280
[45] Date of Patent: Dec. 15, 1992

[54] APPARATUS AND METHOD FOR AUTOMATIC WRITE CURRENT CALIBRATION IN A STREAMING TAPE DRIVE

[75] Inventors: John J. Quintus, Buena Park; Michael S. Sheehan, Laguna Hills; Tuong M. Vu, El Toro, all of Calif.

[73] Assignee: Archive Corporation, Costa Mesa, Calif.

[21] Appl. No.: 428,501

[22] Filed: Oct. 26, 1989

[51] Int. Cl.$^5$ .............................................. G11B 27/36
[52] U.S. Cl. ........................................ 360/31; 360/46
[58] Field of Search ................... 360/31, 46, 48, 66, 360/67; 307/358

[56] References Cited

U.S. PATENT DOCUMENTS

| | | | |
|---|---|---|---|
| 3,519,761 | 7/1970 | Trost | 360/31 |
| 4,295,168 | 10/1981 | Müller | 360/31 X |
| 4,363,977 | 12/1982 | Tsuda et al. | 307/358 |
| 4,414,593 | 11/1983 | Miller et al. | 360/102 |
| 4,490,682 | 12/1984 | Poulo | 330/9 |
| 4,688,113 | 8/1987 | Parsons | 360/67 |
| 4,833,418 | 5/1989 | Quintus et al. | 330/9 |

FOREIGN PATENT DOCUMENTS

| | | |
|---|---|---|
| 0087907 | 9/1983 | European Pat. Off. |
| 0249064 | 12/1987 | European Pat. Off. |
| 55-017836 | 2/1980 | Japan |
| 59-148109 | 8/1984 | Japan |

OTHER PUBLICATIONS

"Method of Optimizing Multitrack, Magnetic Write Head", *IBM Technical Disclosure Bulletin*, vol. 32, No. 1, Jun. 1989, pp. 366–367.

*Streaming*, Copyright © 1982, Archive Corporation, ISBN 0-9608810-0-X, Library of Congress Catalog Number: 82-072125, pp. 5-1 through 5-21.

*Primary Examiner*—Andrew L. Sniezek
*Attorney, Agent, or Firm*—Knobbe, Martens, Olson & Bear

[57] ABSTRACT

An apparatus and a method for calibrating the write current applied to a write head (110, 114) in a tape drive (100) finds the peak value of the write current applied to the tape head (110, 114) (i.e., the write current value providing the maximum read voltage amplitude on a tape (104)) by indirectly measuring the voltage sensed by a read head (112, 115). The apparatus includes a digital write current control circuit (170, 160) that applies a write current having a magnitude responsive to a digital write current value. An amplifier (190) in a read circuit (180, 182, 184, 190, 196) has a gain responsive to a digital read gain value. The method includes the steps of sampling the output of a pattern detector (146) (e.g., a gap detector) as the digital read gain value is adjusted for each of a number of digital write current data values applied to the write current control circuit (170, 160). The digital read gain value is adjusted to provide a predetermined range of the number of samples wherein the pattern corresponds to a predetermined pattern. The digital read gain value for each digital write current value is inversely related to the amplitude of the signal recorded on the tape (104). The sampled digital read voltage gain values are then stored. The digital write current value corresponding to the minimum stored digital read gain value also corresponds to the peak value of the actual write current. The digital write current value corresponding to the minimum digital read voltage gain value is then selected and stored as the calibrated digital write current.

5 Claims, 8 Drawing Sheets

SWEEP ARRAY

| DIGITAL WRITE CURRENT | DIGITAL READ GAIN |
|---|---|
| ⋮ | ⋮ |
| 17 | 48 |
| 18 | 45 |
| 19 | 43 |
| 1A | 40 |
| 1B | 39 |
| 1C | 37 |
| 1D | 35 |
| 1E | 34 |
| 1F | 34 |
| ⋮ | ⋮ |

GAIN ARRAY

| DIGITAL WRITE CURRENT | DIGITAL READ GAIN |
|---|---|
| ⋮ | ⋮ |
| 19 | 43 |
| 1A | 41 |
| 1B | 39 |
| 1C | 37 |
| 1D | 36 |
| ⋮ | ⋮ |

APPARATUS AND METHOD FOR AUTOMATIC WRITE CURRENT CALIBRATION IN A STREAMING TAPE DRIVE

BACKGROUND OF THE INVENTION

1. Field of the Invention

The present invention is in the field of streaming tape drives that store data generated by computers and other digital data devices. More particularly, the present invention is directed to a method for calibrating a streaming tape drive to optimize the magnitude of the current applied to a write head.

2. Description of the Related Art

Magnetic tape is a popular medium for storing large quantities of digital data generated by computers and other digital data devices. Streaming tape drives utilize narrow (e.g., ¼-inch) magnetic tape, and record multiple tracks of data in a generally continuous format on the tape. The digital data is provided as an input to the drive which converts the digital data into a format suitable for recording on the magnetic surface of the tape within the drive. Basically, the digital data are recorded on the tape by a write head as a plurality of magnetic flux changes which can be sensed by a read head. The data are encoded in accordance with a selected recording standard so that the data can be reproduced by the tape drive which records the data, and by other tape drives that operate in accordance with the recorded format.

The magnetic flux density recorded on a tape depends upon a number of factors, one of which is the magnitude of the current applied to the write head when the data is recorded. Ideally, the magnitude of the write current should be selected to be substantially equal to the peak current of the write head. As used herein, the peak current of the write head corresponds to the magnitude of the current that produces the maximum voltage magnitude when the recorded flux changes are sensed by a read head. A write current in excess of the peak current will not increase the magnitude of the voltage generated by the read head, and will in fact cause the magnitude of the voltage to decrease. Generally, magnetic write heads are specified in terms of their respective saturation currents. The saturation current typically will generate magnetic flux transitions that provide a read voltage that is approximately 95% of the maximum read voltage at the peak current. The following description will refer to the peak current of a magnetic write head.

Because of presently used mass production techniques, the commercially available write heads for streaming tape drives have a wide range of peak currents. For example, in an exemplary head specification, an acceptable saturation current may be specified that corresponds to a peak current in the range of 15 milliamperes to 30 milliamperes. It can be seen that a production tape drive that applies a fixed current to a magnetic write head will provide an optimal write current for only a limited number of write heads constructed in accordance with the specification. For example, a tape drive constructed to operate at a write current of 25 milliamperes will operate at less than the peak current for some of the write heads and will operate far in excess of the peak current for other write heads. As set forth above, operation above or below the peak current will result in output voltage from a recorded tape that is less than the maximum output voltage.

One solution to the above-described problem is to manually adjust the operating write current value for each tape drive, so that it corresponds to the peak current of a particular write head to be installed in the tape drive. Although this can be accomplished, the amount of time required to manually adjust each tape drive does not make the procedure economically feasible for production tape drives in which large quantities of tape drives are produced. Thus, a need exists for an apparatus and method for automatically adjusting the write current to an optimal magnitude for a particular write head in a tape drive.

SUMMARY OF THE INVENTION

The present invention is an apparatus and a method for automatically adjusting the write current applied to a write head in a streaming tape drive. The invention employs a digitally controlled write current circuit which outputs a write current which is proportional to an input digital value. The invention also employs a digitally controlled read voltage gain amplifier which adjusts the output read voltage gain in response to digital signals from a read voltage detector.

The method of the present invention automatically calibrates the write current applied to the write head to a peak value which maximizes the voltage sensed at the read head. The method consists of sampling a digital read voltage gain at each of a plurality of digital values, where each digital value corresponds to a value of the write current applied to the write head. The sampled digital read gain values are then stored. The digital write current value corresponding to the minimum stored digital read gain value also corresponds to the peak value of the actual write current. The digital write current value corresponding to the minimum digital read voltage gain value is then selected and stored as the calibrated digital write current value.

A method is disclosed wherein digital values are sequentially applied to the digitally controlled write current circuit, causing write currents to be applied to the write head. For each of the digital values applied to the write current circuit, the following steps are repeated for a determined number of times: 1) A predetermined pattern is written onto a magnetic tape via flux changes at the write head, 2) digital read gain values are sequentially applied to the read voltage amplifier, 3) the output of the read voltage amplifier is monitored while reading the predetermined pattern to determine if the output signal is at a predetermined voltage level, and 4) storing the digital read gain value applied to the read voltage amplifier in a first array when the predetermined voltage level is reached.

Finally, the stored digital read gain values are filtered in a digital averaging subroutine and stored in second array. The digital write current value corresponding to the lowest digital read gain value stored in the second array also corresponds to the write current value which produces the maximum read voltage. The digital write current value corresponding to the lowest digital read gain value stored in the second array is stored in an EEPROM.

This overall method is repeated three times so that three independent digital write current values are obtained and temporarily stored. These three values are then averaged and rounded to the nearest digital write current increment value, which is stored into the EEPROM as the optimum calibrated digital write current value.

DETAILED DESCRIPTION OF THE PREFERRED EMBODIMENT

Figure 1:
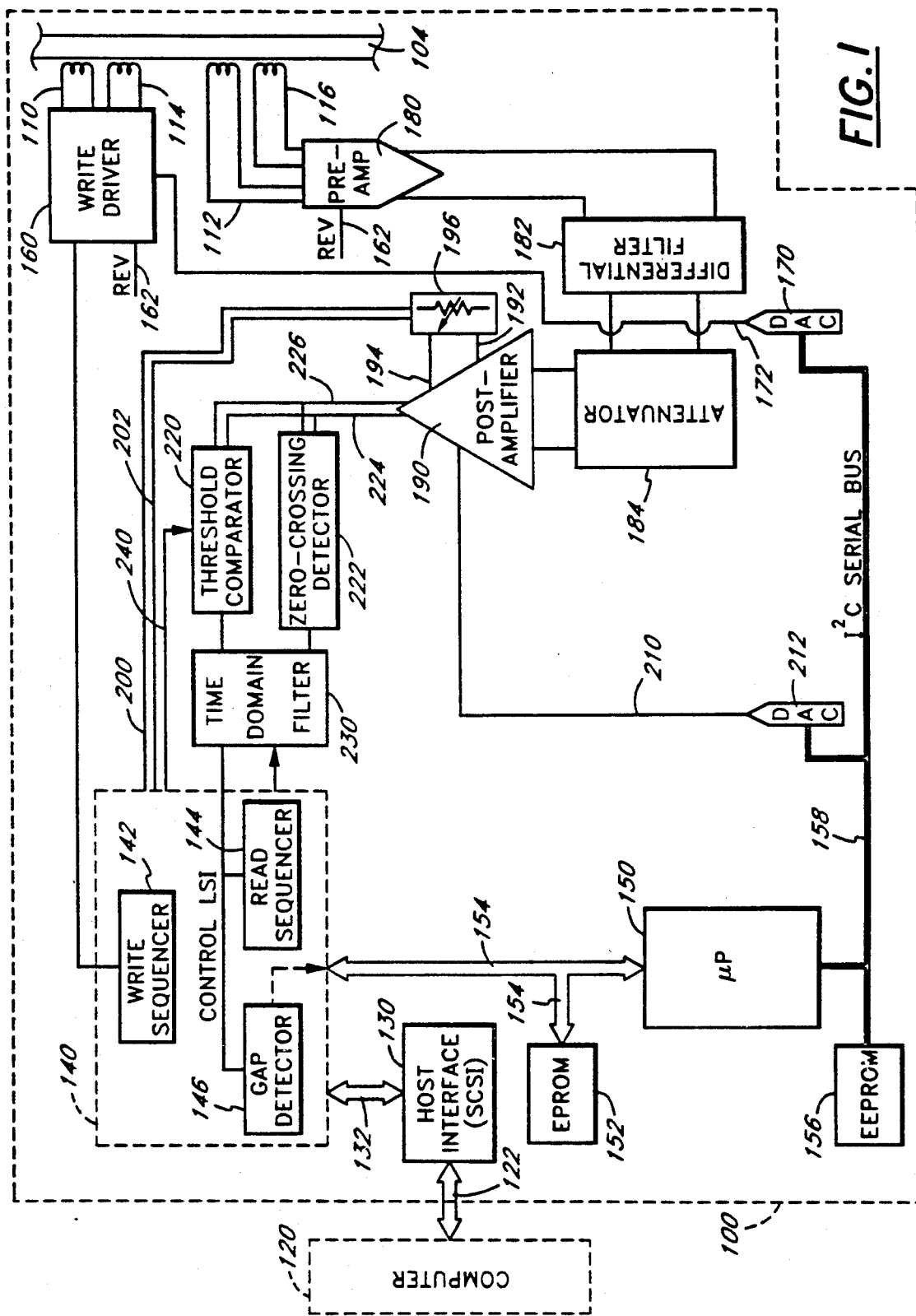
FIG. 1 illustrates a simplified block diagram of an exemplary tape drive system in accordance with the invention.
Figure 2:
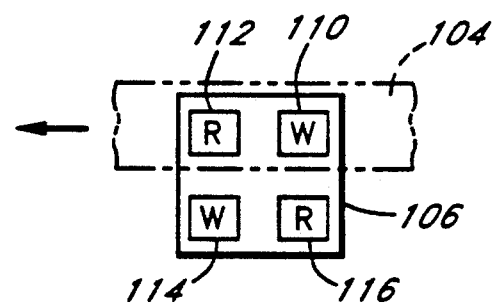
FIG. 2 illustrates a read/write head assembly such as may be employed in the tape drive system of FIG. 1.

FIG. 1 is a highly simplified block diagram of an exemplary streaming tape drive 100 in accordance with the present invention. As illustrated, the tape drive 100 receives a tape cartridge, which includes a length of magnetic recording tape 104. The tape 104 is moved within the cartridge so that it travels longitudinally past a read/write head assembly 106. An exemplary read/write head assembly 106, such as is advantageously employed in the preferred embodiment of the present invention, is illustrated in FIG. 2. As illustrated, the head assembly 106 comprises a write forward head 110, a read forward head 112, a write reverse head 114 and a read reverse head 116. The read forward head 112 is positioned with respect to the write forward head 110 so that as the tape 104 (shown in phantom in FIG. 2) moves longitudinally past the write forward head 110 in a direction from right to left in FIG. 2, a portion of the tape first passes the write forward head 110 and then passes the read forward head 112. Thus, data recorded onto the tape 104 by the write forward head 110 can be immediately reproduced by the read forward head 112. This enables the tape drive 100 to operate in a conventional read-after-write mode so that the integrity of the written data can be checked as it is being written. Similarly, when the tape 104 is juxtaposed with the write reverse head 114 and the read reverse head 116 and moved longitudinally from left to right in FIG. 2, the read reverse head 116 senses the data recorded by the write reverse head 114.

The mechanical components and electronic circuits for moving the tape 104 and positioning the head assembly 106 are conventional components and circuits and are not shown in FIG. 1.

The tape drive system is connected to a computer system 120 (shown in phantom), or the like. For example, the computer system 120 may be an IBM TM PC, AT, PS/2, or any of a number of other commercially-available computer systems. The computer system 120 generates commands to the tape drive system 100 to initiate operations. For example, such operations may include select, position, write data, write file mark, read data, read file mark, and read status commands. The tape drive system 100 responds to the commands by performing selective functions (e.g., writing data onto the tape 104 or reading data from the tape 104). Commands, data, and status are communicated between the computer system 120 and the tape drive system 100 via a bus 122. The bus 122 is constructed to conform to one of a number of industry standards (e.g., the SCSI (small computer systems interface) standard).

The host computer 120 sends data via the bus 122 to a host interface system 130. The host interface 130, in turn, transmits the data via a bus 132 to a controller 140. The controller 140 includes a write sequencer 142, a read sequencer 144, and a gap detector 146. The controller 140 advantageously includes conventional buffer memory (not shown) and associated circuitry to buffer the data received from and transmitted to the host interface 130.

The controller 140 is connected to a microprocessor 150. In the preferred embodiment of the present invention, the microprocessor 150 is advantageously an 8032 microprocessor available from Intel Corporation. The microprocessor 150 includes an internal 256 word by eight-bit random access memory (RAM) and receives instructions from an external read only memory which is implemented by an erasable programmable read only memory (EPROM) 152. The controller 140 transmits data to and receives signals from the microprocessor 150 via an address, data and control bus 154 which also connects the EPROM 152 to the microprocessor 150. The microprocessor 150 is also connected to an electrically erasable programmable read only memory (EEPROM) 156. The EEPROM 156 is advantageously used to store a write current calibration value that is obtained in accordance with the present invention, as will be described below. In the preferred embodiment of the present invention, the microprocessor 150 transmits data to and receives data from the EEPROM 156 via an I²C serial bus 158, Although a parallel bus can also be used.

When data is to be written onto the tape 104 in response to commands from the host computer 120, the data to be written is then transmitted from the host computer 120 to the controller 140 via the host interface 130 and the bus 132. The write sequencer 142 within the controller 140 converts the data into one of a plurality of self-clocking data formats. For example, the write sequencer 142 may encode the data into a modified frequency modulated (MFM) code format. The write sequencer 142 then transmits the MFM signal to a write driver circuit 160. The write driver circuit 160 includes internal drive circuitry (not shown) for each of the write forward head 110 and the write reverse head 114 and is controlled by a head select signal (REV) on a line 162. When the tape 104 is moved in the forward direction, the head select signal is not active and the drive circuitry for the write forward head 110 is active to cause current to be applied to the write forward head 110 in accordance with the MFM data applied to the write driver circuit 160 from the write sequencer 142. Conversely, when the tape is moved in the reverse direction, the head select signal is active and the drive circuitry for the write reverse head 114 is active. The following discussion is directed to the operation of the tape drive 100 when the tape 104 is moved in the forward direction and the write forward head 110 and the read forward head 112 are active; however, the discussion is equally applicable to operation of the tape drive 100 in the reverse direction.

The magnitude of the output current applied to the write forward head 110 by the write driver circuit 160 is controlled by an analog signal output from a six-bit digital-to-analog converter (DAC) 170 on a signal line 172. In the preferred embodiment, the DAC 170, referred to hereinafter as the write current DAC 170, is a TDA8444 DAC available from Signetics that provides six DAC's in an integrated circuit package. The six DAC's are serially controlled so that, in the preferred embodiment, the write current DAC 170 and the other DAC's in the package are controlled by a serial output signal from the microprocessor 150.

The write driver circuit 160 operates as a current amplifier having a gain controlled by the analog signal on the line 172. The write forward head 110 operates in a conventional manner and converts the MFM signal output of the write driver circuit 160 into flux transitions which are encoded onto the tape 104 as it moves longitudinally past the write forward head 110.

As the written portion of the tape 104 moves past the read forward head 112, the forward read head 112 senses magnetic flux transitions on the tape 104 and provides a differential output signal responsive thereto in a conventional manner. The forward read head 112 and the reverse read head 114 are each connected to the input of a read circuit preamplifier 180 that has a respective internal amplifier section (not shown) for each of the two read heads 112, 116. The outputs of the respective amplifiers are connected to an internal multiplexer (not shown) which is controlled by the head select signal (REV) on the line 162. When the tape 104 is moving in the forward direction, the head select signal is inactive and the output of the preamplifier 180 is an amplified signal responsive to the signal from the forward read head 112.

The output of the preamplifier 180 is a differential signal that is provided as an input to a differential, time-differentiating filter 182 which provides a filtered output voltage signal that is also a differential signal. The output of the differential filter 182 is provided to a switched attenuator 184. The switched attenuator 184 provides a differential output signal that has a magnitude that is controlled by an attenuator control signal on a line 186 from the controller 140. In the preferred embodiment described herein, the controller 140 generates the attenuator control signal on the line 186 in response to commands from the microprocessor 150 on the bus 154. When the attenuator control signal is active, the magnitude of the output of the switched attenuator is approximately one-third the magnitude of the output when the attenuator control signal is inactive. In the preferred embodiment, the attenuator control signal is the most significant gain bit of a three-bit gain word.

The differential output of the switched attenuator 184 is provided as an input to a differential post-amplifier 190. The post-amplifier 190 provides an output signal that is responsive to the magnitude of the differential input signal from the switched attenuator 184. The amplification provided by the post-amplifier 190 is controlled by two sets of inputs. The first set of inputs comprise a pair of gain adjustment terminals 192, 194 that control the range of the amplification provided by the post-amplifier in accordance with the resistance in a range selection circuit 196 between the two terminals 192, 194. In the preferred embodiment, the range selection circuit 196 is controlled by a pair of gain bits that comprise the two least significant bits of the three-bit gain word discussed above which are provided to the range selection circuit 196 from the controller 140 via a pair of control lines 200, 202. In the preferred embodiment, the range selection circuit 196 comprises a pair of series connected resistors (not shown) that are selectively by-passed by a respective electronic switch (not shown) to vary the series resistance between the two terminals 192, 194. An increase in the resistance between the two terminals 192, 194 results in a decrease in the output gain of the post-amplifier 190. Similarly, a decrease in the resistance between the two terminals 192, 194 results in an increase in the output gain of the post-amplifier 190.

The second set of control inputs to the post-amplifier 190 comprises a fine gain adjust input on a line 210. The line 210 is connected to the analog output of a six-bit DAC 212 which is preferably part of a six-DAC integrated circuit package with the write current DAC 170 described above and is thus serially controlled by the microprocessor 150. The six-bit DAC 212, referred to hereinafter as the read gain DAC 212, can provide up to 64 analog voltage levels to the fine gain adjust input of the post-amplifier 190. Thus, up to 64 different gains between the differential input and the output of the post-amplifier 190 can be selected. In the preferred embodiment, a digital value of zero on the fine gain adjustment input provides the lowest gain level, and a digital value of 63 corresponds to the highest gain level. It has been found that the read gain DAC 212 operates non-linearly in upper and lower regions of operation (i.e., near an analog output value of zero or an analog output value corresponding to a digital input of 63). It is therefore desirable to operate within a range of 17 hexadecimal to 31 hexadecimal on the digital input of the read gain DAC 212. This hexadecimal range corresponds to a decimal range of 23 to 49. This small range of values does not allow for a wide variation of voltage gain amplification. Therefore, the range selection circuit 196 provides linear amplification over a wide range of gain values while allowing for the fine gradations of gain adjustment necessary to obtain precise measurements. In order to allow the read gain DAC 212 to operate within the linear range at all times, the resistance values in the range selection circuit 196 are selected so that the range of operation selections overlap. For example, in the preferred embodiment of the present invention, the post-amplifier 190 is the amplifier portion of a TL041 streaming tape read/write control circuit available from Texas Instruments, Inc. When using the TL041 circuit as the post-amplifier 190, the preferred embodiment of the range selection circuit 196 provides the following resistance values between the terminals 192 and 194 in response to the gain control input bits:

| | |
|---|---|
| 00 | 2220 Ohms |
| 01 | 1616 Ohms |
| 10 | 920 Ohms |
| 11 | 316 Ohms |

For example, the lower range of gains provided by a resistance value of 1616 Ohms overlaps the upper range of gains provided by the resistance value of 2220 Ohms, and the upper range of gains provided by the resistance of 1616 Ohms overlaps the lower range of gains provided by the resistance value of 920 Ohms. Similarly, the upper range of gains provided by the resistance value of 920 Ohms overlaps the lower range of gains provided by the resistance value of 316 Ohms. Furthermore, the two gain bits that control the range selection circuit 196 operate together with the gain bit that controls the switched attenuator 184 to provide a total of eight gain ranges, with the lowest range corresponding to a binary three-bit gain word value of "100," and the highest range corresponding to a binary three-bit gain word value of "011." (The most significant bit is inverted.)

As set forth above, the post-amplifier 190 amplifies the differential output signal provided by the switched attenuator 184 and provides an amplified output signal. This amplified output signal is provided as an input to a threshold comparator 220 and to a zero-crossing detector 222 via a pair of signal lines 224, 226. The threshold comparator 220 and the zero-crossing detector 222 detect voltage level transitions in the output signal from the post-amplifier 190 and provide respective digital output signals responsive to the transitions. When a signal input to the threshold comparator 220 or to the zero-crossing detector 222 exceeds a certain voltage level (i.e., zero volts for the zero-crossing detector 222, or a predetermined voltage threshold level for the threshold comparator 220) the output of the threshold comparator 220 or the zero-crossing detector 222 becomes active (e.g., a logical "1"). The outputs of the threshold comparator 220 and the zero-crossing detector 222 are provided as inputs to a time-domain filter 230. The time-domain filter 230 preferably is part of a TL041 streaming tape read/write control circuit from Texas Instruments, Inc., and advantageously is included as part of the same integrated circuit package as the post-amplifier 190, discussed above. The time-domain filter 230 includes a two-to-one multiplexer at its input which selects either the signal from the threshold comparator 220 or the signal from the zero-crossing detector 222. The time domain filter 230 operates in a conventional manner to filter the digitized output signal from the selected one of the zero-crossing detector 222 or the threshold comparator 220 before the digital signal is provided as an input to the gap detector 146 and the read sequencer 144.

When the tape drive is reading a previously recorded tape which may have a weak (i.e., low amplitude) signal recorded thereon, the zero-crossing detector 222 is selected as the input to the time-domain filter 230. The zero-crossing detector 222 will generally reproduce such weak signals.

The threshold comparator 220 is used when performing read-after-write operations. The threshold comparator 220 will only detect signal transitions that have a magnitude greater than a predetermined positive or negative threshold. Thus, only those signals wherein the recorded flux transitions produce an amplitude sufficient for the reproduced voltage to exceed the threshold will cause the digital output of the threshold comparator 220 to change states (e.g., from a logical "0" to a logical "1," or from a logical "1" to a logical "0"). The threshold comparator 220 has a variable threshold voltage to which the reproduced voltage is compared. The threshold comparator 220 is responsive to a threshold select signal on a line 240 from the controller 140 to select either a maximum threshold or a threshold that is approximately 25 percent of the maximum threshold. Generally, it has been found that when a signal has a sufficient magnitude to exceed the threshold of the threshold comparator 220 during the read-after-write mode of operation, the same signal will be readily reproducible using the zero-crossing detector 222 when being read on the same tape drive 100 or another tape drive during the playback/reproduce mode.

The read sequencer 144 converts the digital signal from the time domain filter 230 into a digital format corresponding to the original input data from the host interface 130. The data is buffered within the controller 140 and is communicated to the host interface 130 via the bus 132.

The output signal from the time domain filter 230 is also transmitted to the gap detector 146. The gap detector 146 detects the gaps on the tape 104. Such gaps are used to delineate blocks of data on the tape 104 and conventionally comprise a predetermined data pattern on the tape 104 that is readily detectable by the gap detector 146. For example, in the tape drive 100 used with the present invention, a gap comprises at least nine logical ones in a row (i.e., without intervening zeros). Since the recording format of conventional tape drives is run length limited, nine ones in a row cannot occur in recorded data. Thus, the nine or more ones in a row are readily detectable by the gap detector 146. Each time a gap is detected, the output of the gap detector 146 becomes active (e.g., transitions to a logical "1") and remains active as long as the gap continues to be detected (i.e., as long as there are no intervening zeros in the detected pattern). The output from the gap detector 146 is transmitted to the microprocessor 150 via the controller 140, and the bus 154.

When performing a read-after-write operation, the data written onto the tape 104 by the write forward head 110 are sensed by the read forward head 112 immediately thereafter. The sensed data are transmitted to the input of the preamplifier 180 as a read voltage. If the current used to write the data onto the tape 104 is at its optimum value, referred to herein as "$I_{peak}$," then the amplitude of the read voltage sensed by the read forward head 112 and amplified by the preamplifier 180 will be a maximum. Generally, this optimum current will be larger than the saturation current of the write forward head 110 (e.g., $I_{peak}$ is approximately equal to 1.3 $I_{sat}$ in certain exemplary write heads). However, as discussed above, the saturation current of commercially available write heads is generally known only within a relatively broad range of values and is therefore effectively unknown. In addition, the factor by which the saturation current should be multiplied to obtain the peak current is unknown. Thus, the peak current is likewise unknown. The present invention provides a method for setting the write current for the write forward head 110 to its peak value without having to determine the actual magnitude of the current. Although described for the write forward head 110, the same method is applicable to the write reverse head 114.

Figure 3:
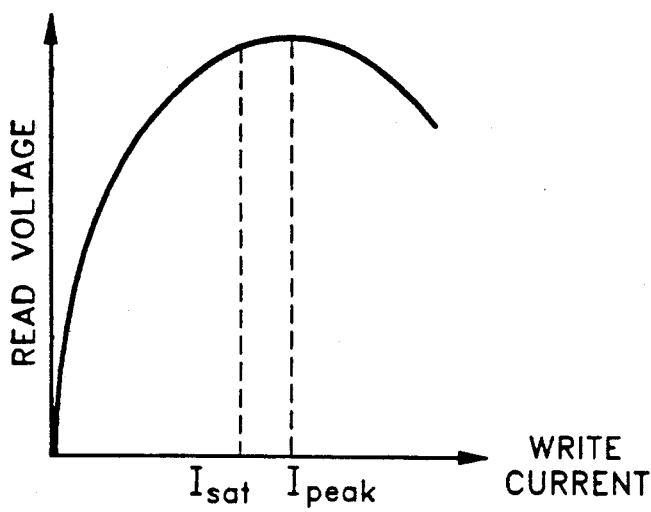
FIG. 3 illustrates the relationship between the output read voltage from the read head and the input write current to the write head.

FIG. 3 is a graphical representation of the amplitude of the read voltage input to the preamplifier 180 versus the magnitude of the write current output from the write driver 160. When the read gain of the postamplifier 190 is maintained at a constant value, the graph in FIG. 3 also represents the amplitude of the output signal generated by the post-amplifier 190 versus the magnitude of the write current. No scales are provided on the two axes of the graph as the actual values of the voltage amplitude and the write current vary from write head to write head. As illustrated in FIG. 3, $I_{peak}$ is the current at which the read voltage amplitude (i.e., the input to the preamplifier 180) is a maximum. The saturation current, "$I_{sat}$," is also illustrated in FIG. 3, and is substantially less than the peak current amplitude $I_{peak}$. If the write current is adjusted to be greater than $I_{peak}$, or less than $I_{peak}$, the read voltage amplitude will decrease accordingly. Any data that is written with a write current that is not at $I_{peak}$ results in a read voltage amplitude that is less than optimum, thereby requiring greater amplification by the post-amplifier 190. A lower amplitude signal will also be more susceptible to noise.

Figure 4:
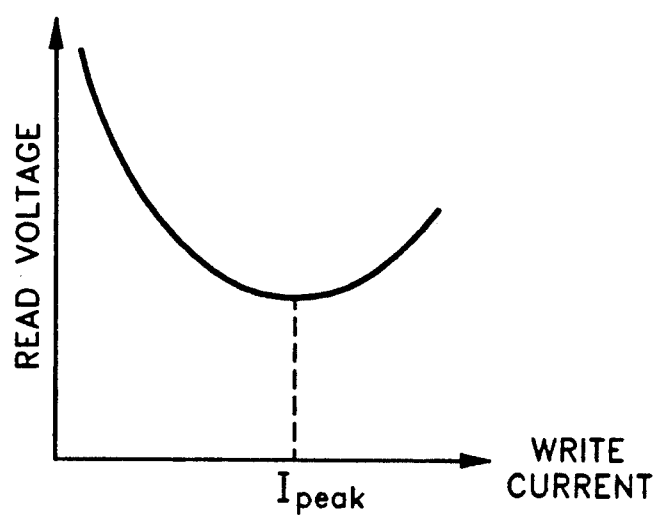
FIG. 4 illustrates the relationship between the read gain of the read amplifier and the input write current to the write head which provides a substantially constant output from the read amplifier.

The method of the present invention utilizes the gain adjustment value applied to the post-amplifier 190 as a means of indirectly measuring and setting the optimum write current applied to the write head 110. As will be discussed more fully below, in the method of the present invention, the gain of the post-amplifier 190 is adjusted as the magnitude of the write current is adjusted so that the magnitude of the output voltage from the post-amplifier 190 is maintained substantially constant. Since the amplitude of the read voltage from the read forward head 112 is at a maximum when the write current is adjusted for $I_{peak}$, the read voltage gain required to maintain the magnitude of the post-amplifier output voltage constant will be a minimum at $I_{peak}$. The relationship between the read voltage gain and the write current amplitude to provide a substantially constant output voltage from the post-amplifier 190 is illustrated as a read gain curve in FIG. 4. From FIGS. 3 and 4, it can be understood that the read voltage amplitude is inversely related to the read voltage gain (i.e., as the read voltage amplitude increases, the read voltage gain decreases to maintain a constant post-amplifier output voltage, and as the read voltage amplitude decreases, the read voltage gain increases).

Figure 8:
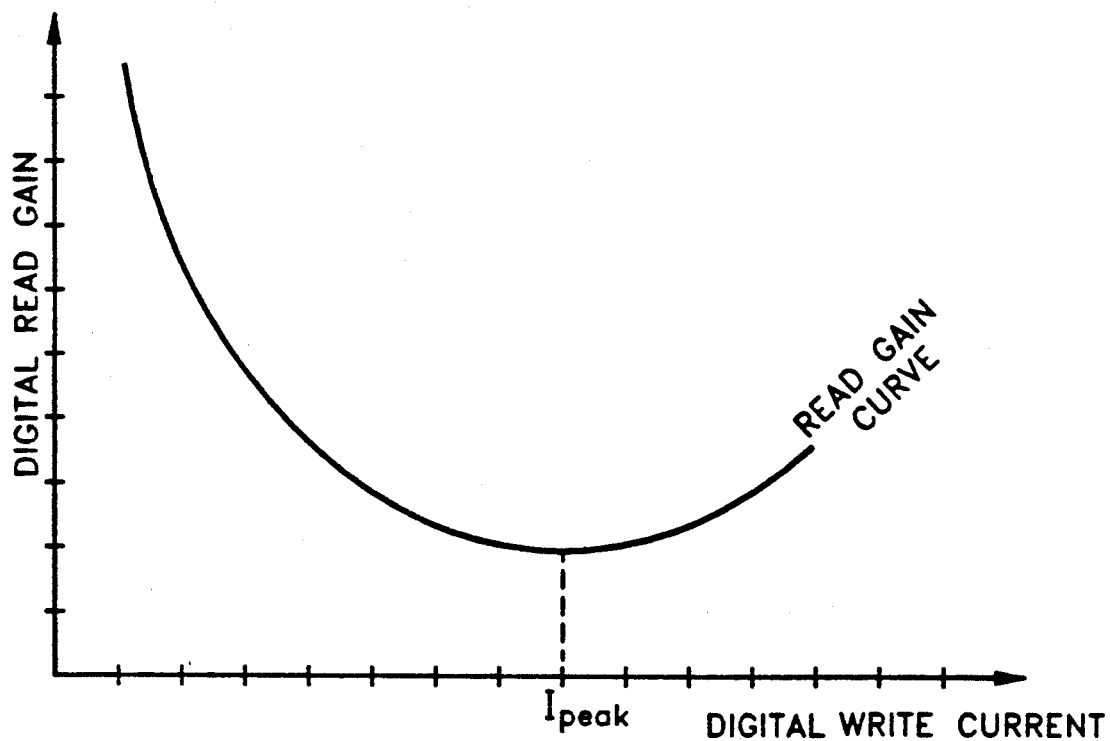
FIG. 8 illustrates a read gain curve that shows the relationship between the digital values controlling the read gain and the digital values controlling the write current.

In the preferred embodiment of the present invention, the actual write current, and the actual read voltage gain are responsive to the digital values applied to the write current DAC 170 that controls the write driver 160, and the read gain DAC 212 that controls the post-amplifier 190, respectively. For this reason, it is not necessary to know the actual write current value when calibrating the tape drive system 100 to $I_{peak}$. In practice, it suffices to know only the digital value corresponding to the actual value of $I_{peak}$. FIG. 8 illustrates a graph of the read gain curve that shows the relationship between the digital write current and the digital read voltage gain. Note that the graph of the read gain curve of FIG. 8 is similar to the graph of FIG. 4 with the exception that the axes in FIG. 8 are labeled in digital increments.

Figure 5:
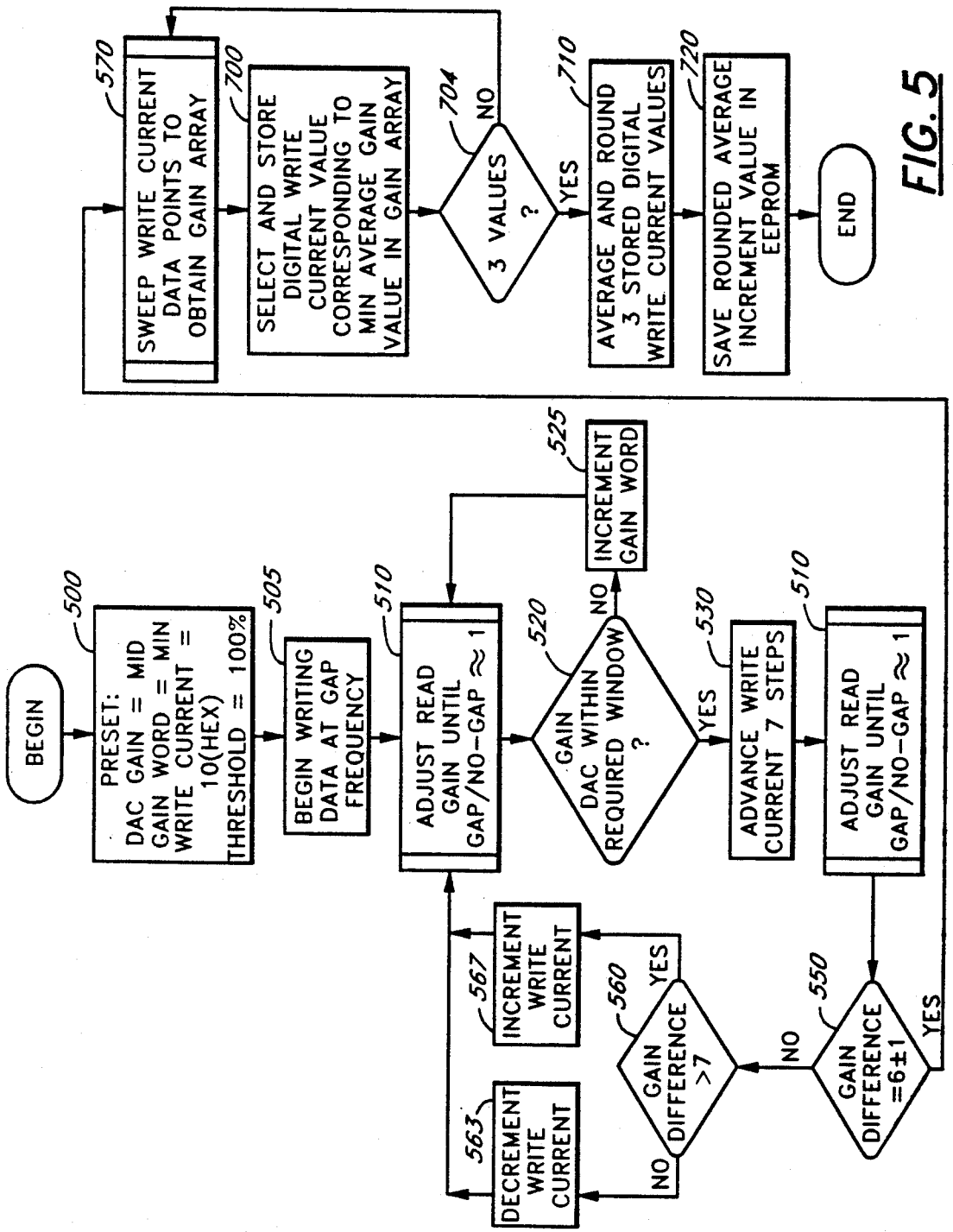
FIG. 5 illustrates a flowchart which details the overall method of operation in accordance with the present invention.

The method of the present invention calibrates the write current to its optimal value, $I_{peak}$. This method is outlined in the flow chart of FIG. 5. As illustrated in FIG. 5, the method initially enters a process block 500 in which certain system parameters are set. These system parameters include the differential threshold voltage, the initial digital write current value applied to the write current DAC 170, the digital gain value applied to the read gain DAC 212, and the three-bit gain word. Advantageously, the differential threshold voltage is selected to be 100%. The digital write current value is initially set to a value that results in a write current that is less than the lowest expected saturation current $I_{sat}$ (e.g., 10 milliamps). The digital value applied to the read gain DAC 212 is selected to be a value within the middle of the range of operation of the read gain DAC 212 (i.e., between digital steps 23 and 49 decimal) to assure that the read gain DAC 212 operates in the linear region. The three-bit gain word should be set at its minimum value (i.e., 100 in binary) so that the switched attenuator 184 and the post-amplifier 190 are initially operating within the lowest range of overall amplification.

After the initial parameters are set, the method enters a process block 505 wherein data from the controller 140 is applied to the write drive 160 to begin writing data onto the tape 104. The data applied to the write driver 160 is selected to correspond to all ones so that a continuous gap is written onto the tape 104 at the gap frequency as the tape 104 moves in the forward direction. While the gap data is being written onto the tape 104, the method enters a read gain adjustment subroutine 510. In the read gain adjustment subroutine 510, the digital read gain values applied to the read gain DAC 212 are incrementally changed to adjust the read gain while the output of the gap detector 146 is monitored by the microprocessor 150. The read gain is adjusted until the number of samples at the output of the gap detector 146 which indicate that a gap is detected is approximately equal to the number of samples taken at the output of the gap detector 146 which indicate that no gap is detected. For example, in the preferred embodiment, the microprocessor 150 takes 255 samples, and the read gain is adjusted so that approximately 128 samples indicate the detection of the gap pattern. It should be noted that it is not necessary for the gap/no-gap ratio to be equal to one in order to properly determine $I_{peak}$. In principle, any gap-to-no-gap ratio may be employed as long as this detection ratio is used consistently throughout the entire method. The read gain adjustment subroutine 510 is discussed below in detail in accordance with FIG. 6.

Once the desired gap/no-gap ratio is achieved, the method enters a decision block 520 wherein the microprocessor 150 determines whether or not the read gain DAC 212 is operating within the linear region (i.e., the digital value applied to the read gain DAC 212 lies between 23 and 49 decimal). If the read gain DAC 212 is not operating within the required range, a new range of operation is selected in a process block 525, wherein the three-bit gain word is incremented by one. The method then re-enters the read gain adjustment subroutine 510 and adjusts the read gain until the desired gap/no-gap ratio is achieved. Thereafter, the method again enters the decision block 520 wherein the digital read gain value is checked to determine whether it is within the acceptable range. The read gain adjustment subroutine 510 and the blocks 520 and 525 are repeated until the digital read gain value is within the acceptable range.

Once the three-bit gain word is adjusted so that the digital read gain value applied to the read gain DAC 212 is within the required range of operation, the method enters a process block 530, wherein the digital write current value is incremented by seven digital steps (e.g., from a digital value of 11 decimal to a digital value of 18 decimal). After the digital write current value is incremented, the method enters the read gain adjustment subroutine 510, wherein the read gain is again adjusted until the desired gap/no-gap ratio (e.g., approximately equal to one) is achieved.

After the desired gap/no-gap ratio is achieved in the block 510, the method enters a decision block 550, wherein the microprocessor 150 determines whether or not the digital difference between the read gain corresponding to the first digital write current value (e.g., 11), and the read gain corresponding to the second digital write current value (e.g., 18), is between five and seven. This assures that the system is operating on a region of the read gain curve (illustrated in FIGS. 4 and 8 discussed above, and in FIGS. 9 and 11 discussed hereinafter) which is not too close to the optimum write current value, $I_{peak}$, and which is also not too far from $I_{peak}$. If the method starts operating in a region which is too far from $I_{peak}$, then the microprocessor 150 may be required to sample a great number of write current values before reaching $I_{peak}$. Determination of the peak write current value from the sampled write current values is time consuming, and sampling of a large number of write current values requires a write current DAC 170 with enough capacity to increment the write current over all the sampled values while remaining in the linear region of the write current DAC 170. If the system is operating in a region on the read gain curve which is too close to $I_{peak}$, then the number of samples taken before $I_{peak}$ is reached may not be sufficient to perform a proper digital filtering of the digital write current values. Therefore, it is advantageous to sample a moderate number (e.g., 20 to 40) of write data points in the proximity of $I_{peak}$.

Figure 9:
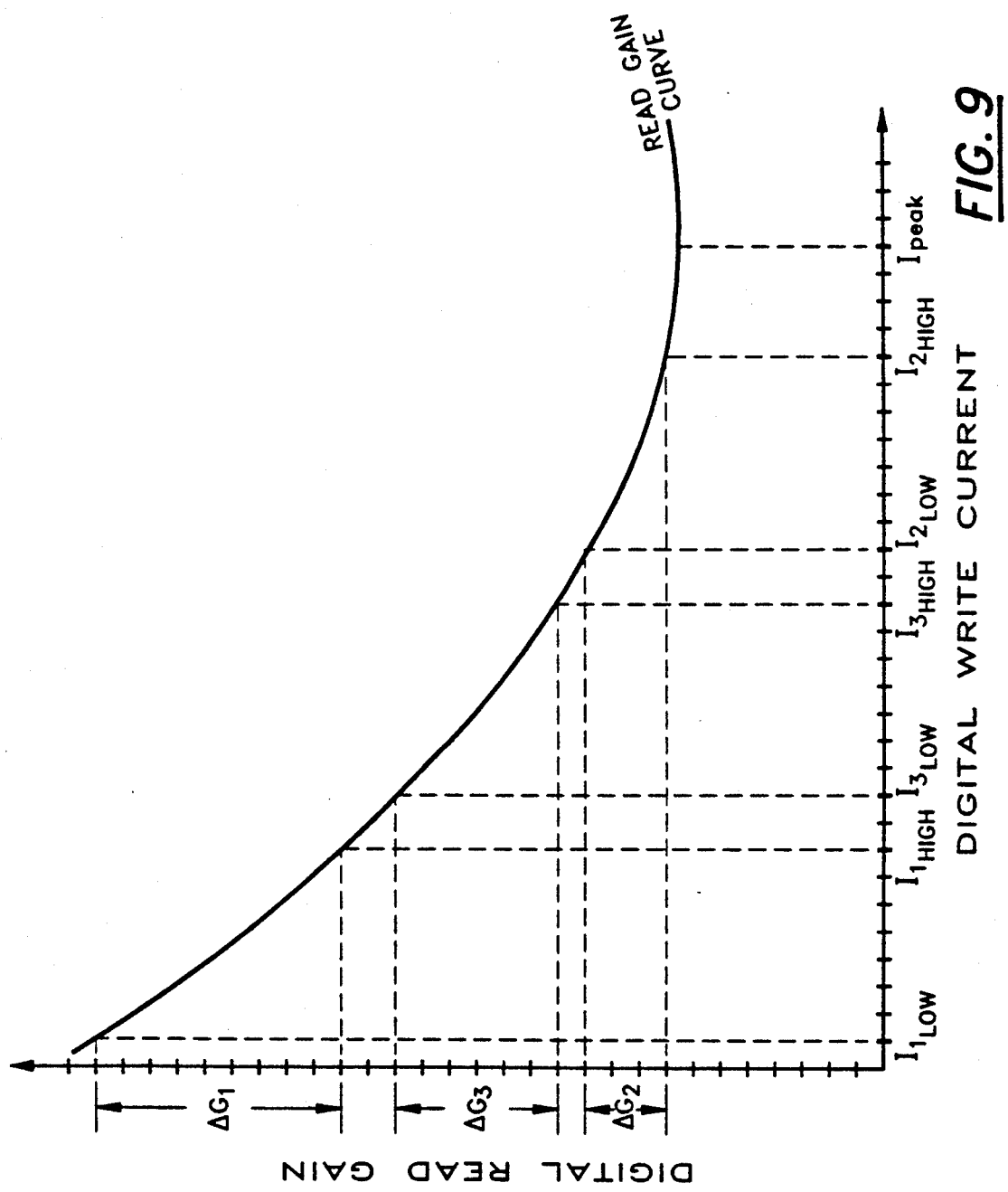
FIG. 9 illustrates a read gain curve having three portions that correspond to pairs of digital write current values, each pair of digital write current values having a corresponding digital read gain difference.

FIG. 9 illustrates three sample pairs of digital write current values and their corresponding digital read gain values. Each pair of digital write current values are spaced seven increments apart in accordance with the method of the present invention. As illustrated in FIG. 9, the first pair of digital write current values ($I1_{LOW}$ and $I1_{HIGH}$ located on the left in FIG. 9) have corresponding digital read gain values which are more than seven increments apart. This indicates that the system is operating on a portion of the read gain curve which is too far from $I_{peak}$. The second pair of digital write current values ($I2_{LOW}$ and $I2_{HIGH}$ located on the right in FIG. 9) have corresponding digital read gain values which are less than five increments apart. This indicates that the system is operating on a portion of the read gain curve which is too close to $I_{peak}$. Finally, the third pair of digital write current values, $I3_{LOW}$ and $I3_{HIGH}$ in FIG. 9, have corresponding digital read gain values which are six increments apart. This indicates that the system is operating on a proper portion of the read gain curve.

If the digital read gain difference is either greater than seven or less than five, then the method enters a decision block 560, wherein a determination is made if the gain difference is greater than seven or less than seven. If the gain difference is less than seven, then the method enters a process block 563, wherein the lower value of the pair of digital write current values (e.g., $I2_{LOW}$ in FIG. 9) is decremented, and the method re-enters the read gain adjustment subroutine 510. If the gain difference is greater than seven, then the method enters a process block 567, wherein the lower value of the pair of digital write current values (e.g., $I1_{LOW}$ in FIG. 9) is incremented, and the method re-enters the read gain adjustment subroutine 510. In the read gain adjustment subroutine 510, the read gain corresponding to the new first digital write current is adjusted until the desired gap/no-gap ratio is achieved (i.e., approximately equal to one). Again, a test is performed in decision block 520 to determine if the read gain DAC 212 is operating within the linear region. Once the read gain DAC 212 is operating within the linear region, the method re-enters the process block 530, wherein the digital write current is advanced seven steps. The method again enters the read gain adjustment subroutine 510, wherein the read gain corresponding to this new second digital write current is adjusted until the desired gap/no-gap ratio is achieved. This entire cycle repeats itself until two digital write current values, which are seven increments apart, are determined to have corresponding read gain values which are within five to seven digital steps apart. The lower digital write current value so determined (i.e., $I3_{LOW}$) is used as the starting write current value for the steps described below. By selecting the starting write current value in this manner, it can be assured that the following steps find the peak current within a reasonably short number of samples (e.g., less than 45 samples) yet provide a sufficient number of samples (e.g., at least 20 samples) to be able to perform the averaging steps to be described below.

Once the starting digital write current value has been determined as described above, the method enters a subroutine 570 wherein the digital write current value is incremented and the digital read gain value is determined for each write current value (i.e., the digital read gain value is adjusted to achieve the desired gap/no-gap ratio as described above). Also, within the subroutine 570, the digital read gain values are averaged to obtain a filtered array of values that are used in subsequent steps to find the peak digital write current value. The subroutine block 570 will be described below in greater detail in accordance with FIG. 10.

Figures 11, 12A, 12B:
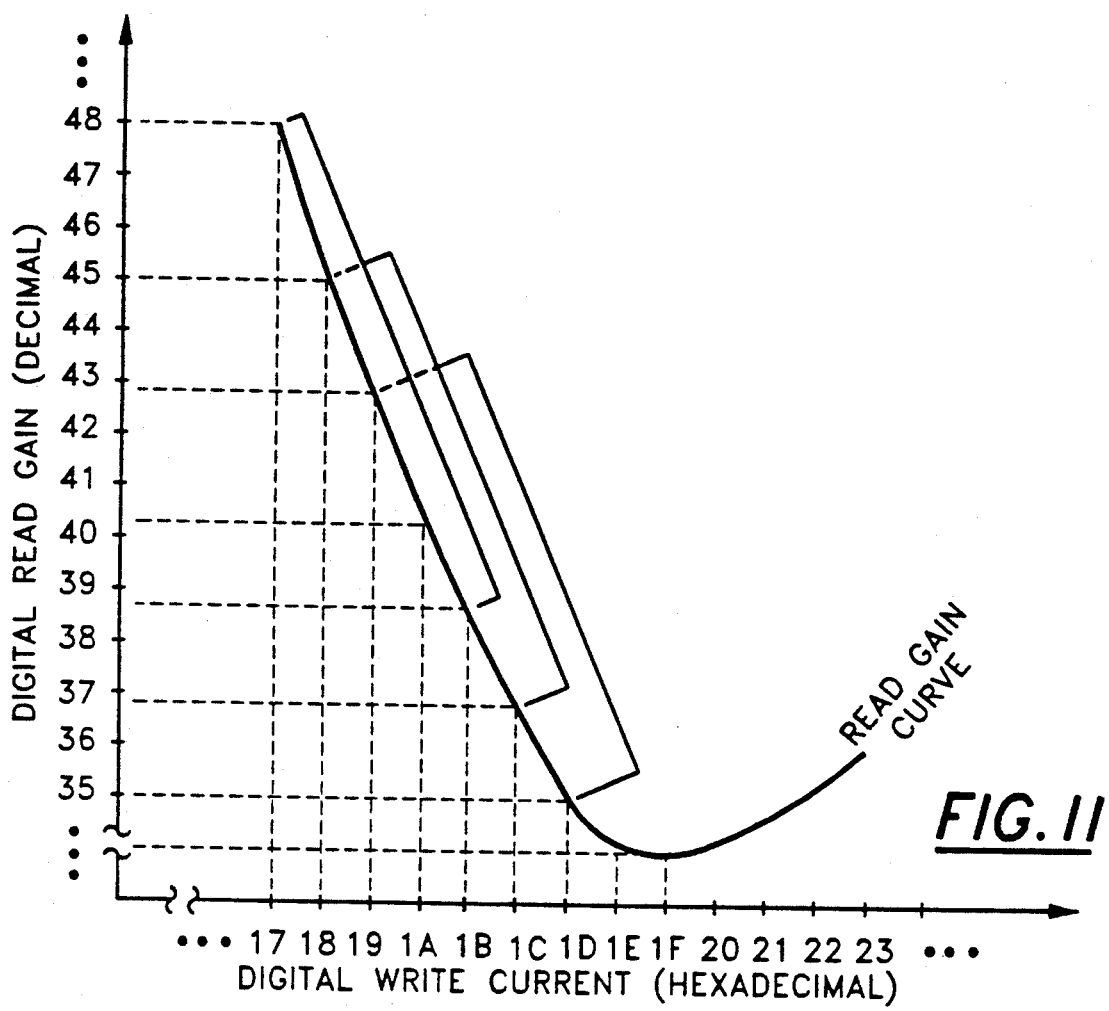
FIG. 11 illustrates the read gain curve, further showing the grouping of five successive digital read gain values into a five-value window, and showing the shifting of the window to the next group of five successive digital read gain values.
FIGS. 12A and 12B illustrate an exemplary sweep array, and an exemplary gain array, each array location containing a hexadecimal digital write current value as an index, and a decimal digital read gain value.

Because there is the possibility of noise spikes in the tape drive circuitry, it is possible that a read voltage gain value will be detected that is different from the actual read voltage gain value corresponding to $I_{peak}$. For this reason it is necessary to do a digital averaging of the read voltage gain values in order to filter out the effects which may be caused by a noise spike. In the subroutine 570, the digital write current data points are swept in order to obtain a gain array 572 (FIG. 12B). Starting from the lower of the two digital write current values (i.e., $I3_{LOW}$ in FIG. 9), the read gain corresponding to each increment of the digital write current is sampled for a predetermined number of steps. The sweeping occurs by averaging the first five read gain values corresponding to the first five write current data points, then averaging the second through the sixth read gain values corresponding to the second through sixth write current data points, etc. This sweep averaging continues until the last five read gain values have been averaged. The values obtained from the averaging of the read gain values are rounded to the nearest digital read gain value (for example, an average of five values resulting in a value of 32.4 would be rounded to the digital read gain value of 32). Each digital value corresponding to an average of five read gain values is stored into the gain array 572.

Figure 10:
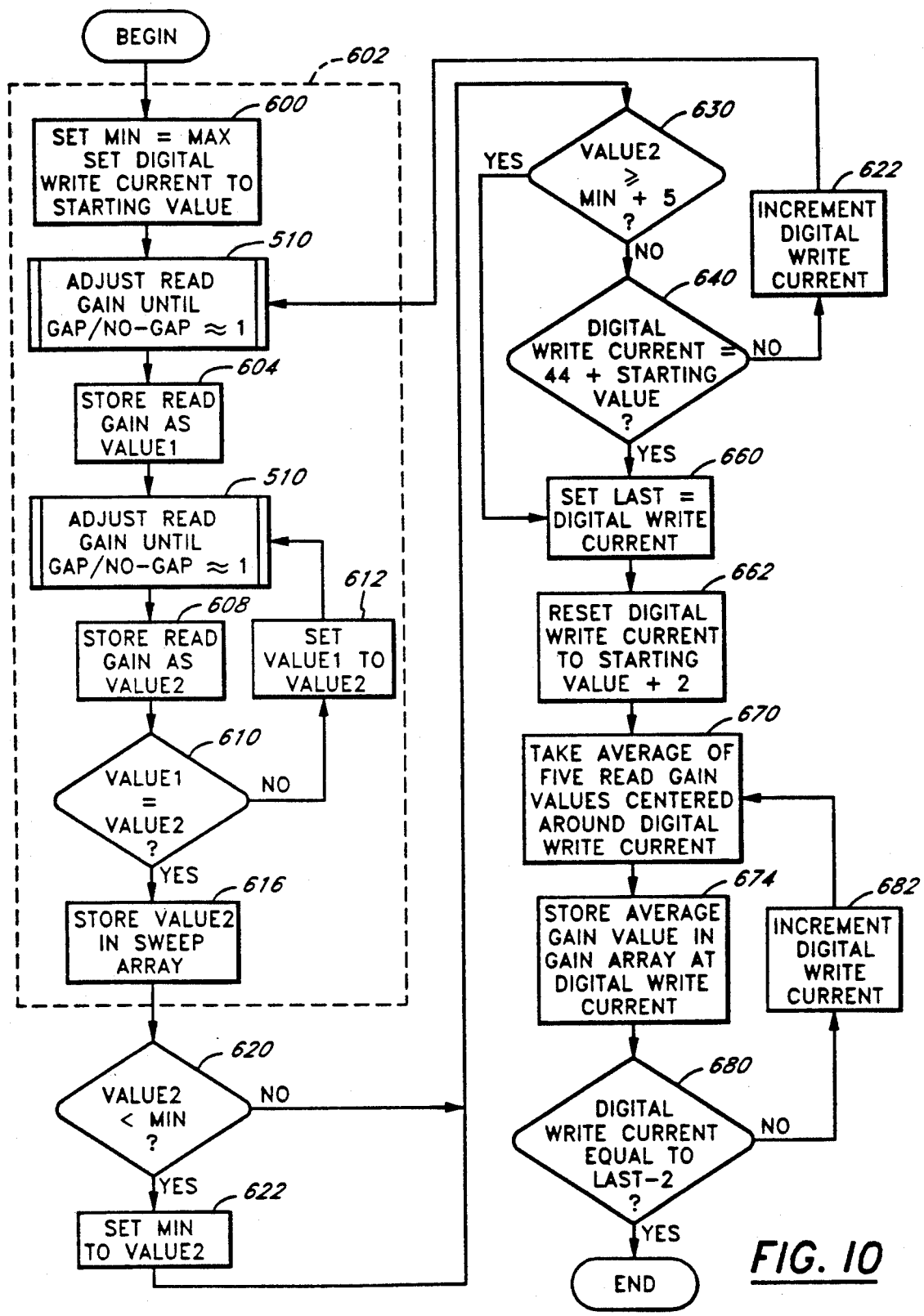
FIG. 10 illustrates a flowchart which details the steps of the subroutine of FIG. 5 which sweeps the digital write current values.

FIG. 10 illustrates the details of the write current sweep subroutine 570 of FIG. 5 in which the gain array 572 is obtained. A digital write current value corresponding to $I_{peak}$ may be determined from the gain array 572. In the subroutine 570, the method initially enters a process block 600 wherein the digital write current is set to the lower value of the pair of digital write current values determined above (i.e., $I3_{LOW}$). A variable MIN, which is used to keep track of the minimum digital read gain value, is set to the maximum possible digital read gain value. For a six-bit DAC such as used in the preferred embodiment of the present invention, this maximum digital read gain value is 63 decimal.

After initializing the parameters, the method enters a process block 602 which comprises a plurality of process blocks, decision blocks and subroutines to determine a digital read gain value associated with a digital write current value. Within the process block 602, the method first utilizes the read gain adjust subroutine 510, described above, to determine a read gain at which the desired gap/no-gap ratio is achieved (e.g., a gap/no-gap ratio of approximately one). Following the adjustment of the read gain in the read gain adjustment subroutine 510, the method returns to the subroutine 570 and enters a process block 604 wherein the digital read gain value determined in the adjustment subroutine 510 is saved as a variable VALUE1.

In order to check that the digital read gain value stored as VALUE1 is the correct value, and is not the effect of a noise spike or tape dropout, the method again enters the read gain adjustment subroutine 510 wherein a second determination of the digital read gain is made at the same corresponding digital write current value. This second digital read gain value is saved as a variable VALUE2 in a process block 608. The method then enters a decision block 610 wherein VALUE1 is compared to VALUE2. If VALUE1 is not equal to VALUE2, this means that an error has been made in the determination of one of the two digital read gain values. In the event that VALUE1 is not equal to VALUE2, the method enters into a process block 612 wherein VALUE1 gets assigned the value of VALUE2. The method again utilizes the read gain adjustment subroutine 510 wherein a new digital read gain value is determined at the same corresponding digital write current value. The new digital read gain value is then saved as VALUE2 in the process block 608. Once again a test is performed in the decision block 610 to determine if VALUE1 and VALUE2 are equal. This cycle repeats until two digital read gain values in a row are equal.

Once two digital read gain values in a row are determined to be equal (i.e., VALUE1 equals VALUE2) the method enters a process block 616 wherein VALUE2 (or equivalently VALUE1) is stored in a sweep array 618 illustrated in FIG. 12A. Advantageously, the sweep array 618 is implemented as a plurality of memory locations in the 256-byte RAM within the microprocessor 150. In the preferred embodiment of the present invention, the sweep array 618 is indexed by the digital write current (i.e., the digital write current values are used to determine the addresses within the RAM where the digital read gain values are stored).

After the digital read gain value is stored in the sweep array 618, the method exits the process block 602 and enters a decision block 620. Within the decision block 620, a test is performed to determine if the last digital read gain value stored (i.e., VALUE2) is less than the current value of MIN. If VALUE2 is less than MIN, then the method proceeds to a process block 622 wherein the variable MIN is assigned the value of VALUE2. In this way, the minimum digital read gain value is always assigned to MIN. If VALUE2 is greater than MIN, then the method bypasses the process block 622 and to enter a decision block 630.

In the interest of saving calculation time, it is advantageous to stop sampling shortly after the minimum digital read gain value is obtained. When the minimum read gain value is obtained, the corresponding digital write current value will be close to $I_{peak}$. In the decision block 630, a test is made to determine if VALUE2 is greater than or equal to MIN+5. This test is performed in order to determine if the minimum digital read gain value has been detected. Since the read gain curve is continuous and has only one minima, any substantial increase in the digital read gain (e.g., 5 increments) while sampling from left to right in FIG. 9 indicates that the minimum point on the read gain curve has already been detected. Therefore, if the current digital read gain value, VALUE2, is five increments greater than the lowest detected read gain value, MIN, the method should stop the sampling process. Thus, in the decision block 630, if VALUE2 is determined to be greater than or equal to MIN+5, the method branches to a process block 660. Otherwise, the method continues to a decision block 640.

In the decision block 640, a test is performed to determine if the present digital write current value is equal to the starting digital write current value plus decimal 44. If the digital write current value has been incremented 44 times prior to the detection of a digital read gain value which is five increments greater than MIN, then the method exits the sampling portion of the method and enters a process block 660. Otherwise the method continues to a process block 642 wherein the digital write current is incremented. For practical applications it is highly improbable that the digital read gain corresponding to $I_{peak}$ would not be detected within 44 increments of the starting digital write current value. Thus, this event need not be accounted for. After the digital write current is incremented in the process block 642, the method loops back into the first read gain adjustment subroutine 510 within the process block 602 and the sampling cycle continues.

Once the sampling process is completed, (i.e., VALUE2 is greater than or equal to MIN+5, or the digital write current value has been incremented 44 times from its starting value) the method will have entered the process block 660. In the process block 660, a variable LAST is assigned the value of the present digital write current value. The method then enters a process block 662 wherein the digital write current value is reset to its starting value plus two (i.e., $I3_{LOW}+2$). The addition of two increments to the starting digital write current value places the digital write current value at the center value of the first five digital write current values. If a different number of values are to be averaged in each step, the initial center value can be readily calculated by adding (n−1)/2 to the starting digital write current value, where n is the number of values to be averaged. The method then enters a process block 670 wherein five digital read gain values stored in the sweep array 618 are averaged and rounded to the nearest digital read gain value. The five digital read gain values which are averaged are the digital read gain values that correspond to the center write current value, the two write current values immediately below the center write current value, and the two write current values immediately above the center write current value. As mentioned above, the digital write current value is also the index value of the sweep array 618. The five-value average is then stored into the gain array 572 (FIG. 12B) in a process block 674. The gain array 572 is advantageously implemented as a plurality of memory locations within the RAM of the microprocessor 150, and is also indexed by the digital write current value. The average of the five digital read gain values is stored at the location of the gain array 572 corresponding to the center digital write current value. The digital write current is also used as an index for the gain array 572.

After storing the average read gain value, the method proceeds to a decision block 680 where a test is made to determine if the digital write current value is equal to the value LAST-2. If the digital write current value is equal to LAST-2, then the method exits the subroutine 570. Otherwise, the method continues to a process block 682 wherein the digital write current value is again incremented. After incrementing the digital write current, the method again enters the process block 670 wherein the five digital read gain values centered on the present digital write current value are averaged as described above. Since the digital write current value was incremented, the second five values to be averaged would be the second through sixth digital read gain values. The cycle continues in this way, shifting a five-value window over the sweep array 618, and averaging the five digital read gain values within each window.

FIGS. 11, 12A, and 12B further illustrate the shifting and five-value averaging process outlined above. FIG. 11 illustrates the digital read gain (in decimal increments) plotted versus the digital write current (in hexadecimal increments). Note that the digital read gain is scaled in decimal increments because it is easier to illustrate the averaging of decimal numerals rather than hexadecimal numerals. It should be re-stated that these digital values are representations which correspond to actual analog read gain and write current values, and it is the digital values which are averaged. Moreover, it is not necessary for the actual analog values to be known to employ the calibration method of the present invention.

FIG. 11 further illustrates three windows, each window comprising five digital read gain values. Each window is indicated by a bracket along the read gain curve. The first window includes the digital read gain values corresponding to the digital write current values from 17(Hex) to 1B(Hex), and is centered at 19(Hex). As illustrated in the sweep array 618 of FIG. 12A, the digital read gain values corresponding to the digital write current index values of 17, 18, 19, 1A, and 1B are 48, 45, 43, 40, and 39, respectively. (It should be understood that these are exemplary values for purposes of illustration. The actual values will vary in accordance with the characteristics of the write heads, the read heads, and the read electronics.) The average of the five digital read gain values in the first window is 215/5 or 43. This average digital read gain value is then stored in the gain array 572 at the location indexed by the digital write current value at the center of the first window (e.g., 19(Hex) in FIG. 12B). After the average digital read gain value is stored in the gain array 572, the digital write current value is incremented, and the five-value window shifts to the location of a second window illustrated in FIG. 11.

The second window illustrated in FIG. 11 includes the digital read gain values corresponding to the digital write current values from 18(Hex) to 1C(Hex), and is centered at 1A(Hex). The digital read gain values corresponding to the digital write current values of 18, 19, 1A, 1B, and 1C(Hex) are 45, 43, 40, 39, and 37, respectively. The average of the five digital read gain values in the second window is 204/5 or 40.8 which is rounded to a digital value of 41. This average value is then stored in the gain array 572 at the digital write current value in the center of the second window (i.e., 1A(Hex) in FIG. 12B). After the average digital read gain value is stored into the gain array 572, the digital write current value is incremented, and the five-value window shifts to the location of a third window shown in FIG. 11.

The method continues in this way, shifting the five-value window by one increment, averaging the five digital read gain values in each window, storing the average value in the gain array 572 at the digital write current value in the center of each window, and then shifting the window again by one increment, until all the digital read gain values stored in the sweep array 618 have been included in the averaging process.

The averaging of five digital read gain values operates to filter noise spike effects within the sweep array 618. Note that the first two and the last two digital write current values of the sweep array 618 do not serve as center values for any of the windows, so that when the cycle is completed the gain array 572 will contain four fewer elements than the sweep array 618.

Now, returning to the overall flowchart in FIG. 5, following the subroutine 570, the method enters a process block 700, wherein the digital write current value corresponding to the minimum read gain value in the gain array 572 is selected and stored. Next, the method enters a decision block 704, wherein the method determines whether three digital write current values have been selected. If three digital write current values have not yet been selected, then the method returns to subroutine 570, wherein the method once again sweeps the digital write current values starting with the initial value $I3_{LOW}$ to obtain a new gain array 572. Thereafter, the method re-enters the process block 700, wherein a new digital write current value corresponding to the minimum digital read gain value in the new gain array 572 is selected and stored. This is repeated until three minimum digital write current values have been selected and stored.

After three minimum digital write current values have been selected and stored, the method exits the decision block 704 and enters a process block 710, wherein the three selected minimum values are averaged. The average is rounded to the nearest digital write current value. The method then enters a process block 720 wherein the averaged digital write current value is stored in the EEPROM 156. The digital write current value stored in the EEPROM 156 is transmitted to the write current DAC 170 each time data is written onto the tape 104 so that the write driver 160 will output the optimum write current, $I_{peak}$, to the write head 110.

Figure 6:
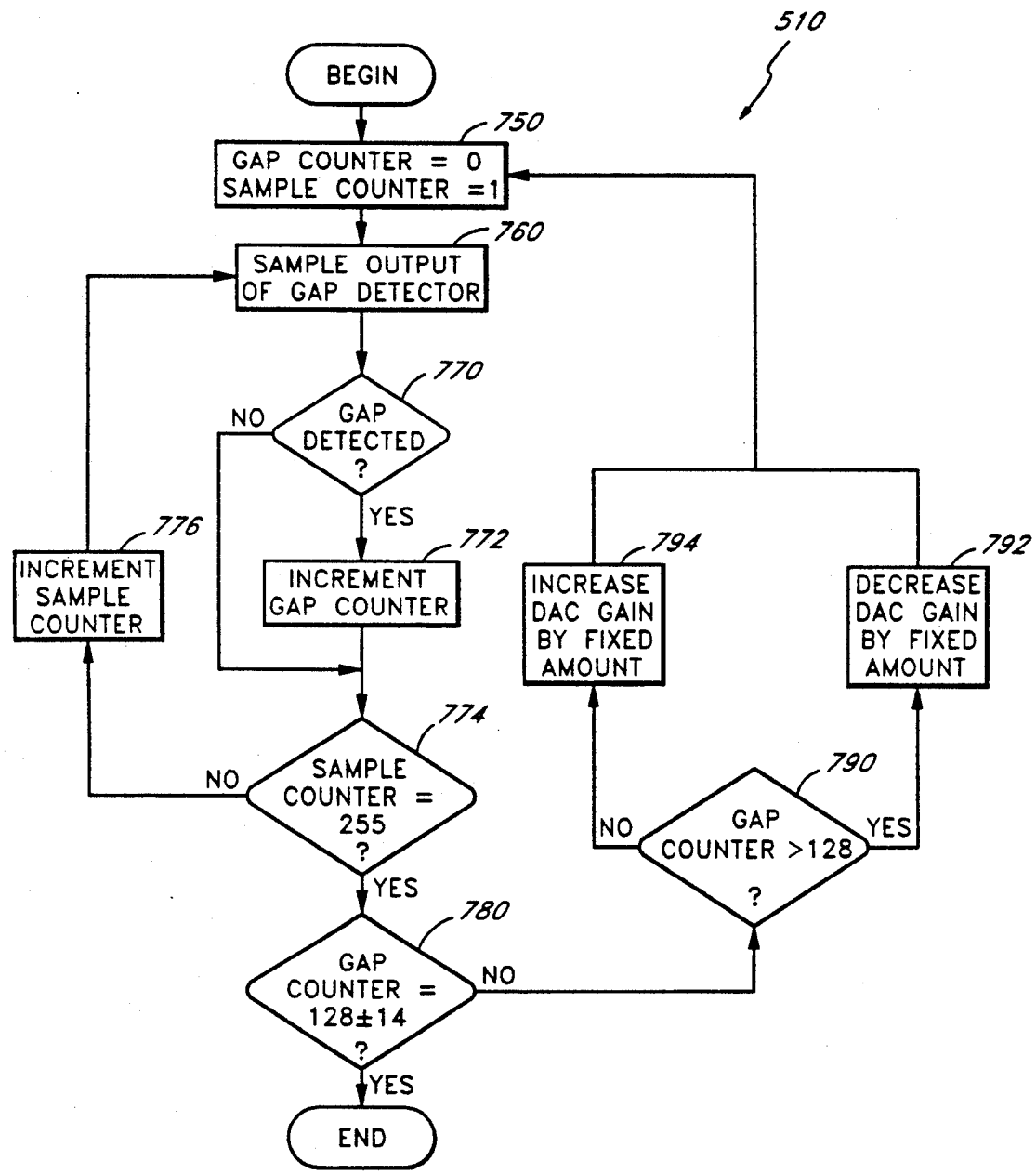
FIG. 6 illustrates a flowchart which details the steps of the read gain adjust subroutine in FIG. 5.

FIG. 6 is a flowchart that illustrates the details of the method of the digital read gain adjustment subroutine 510 briefly described above. The read gain adjustment subroutine 510 begins by entering a process block 750 wherein two counters are initiated. The two counters are advantageously implemented as registers or memory locations in the microprocessor 150. The first counter, referred to herein as the "gap counter", is initialized to zero, while the second counter, referred to herein as the "sample counter", is initialized to one.

Figure 7:
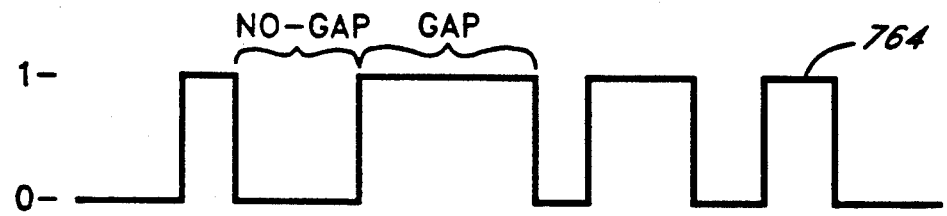
FIG. 7 illustrates an exemplary output waveform such as may be found at the output of the gap detector of FIG. 1 when the post-amplifier of FIG. 1 is adjusted in accordance with the method of the present invention.

After initializing the two counters, the method enters a process block 760, wherein one sample is taken of the output of the gap detector 146. An exemplary waveform 764 at the output of the gap detector 146 is illustrated in FIG. 7. The regions of the waveform 764 which are at a logical "1" (i.e., high) level indicate the detection of a gap, while the regions which are at a logical "0" (i.e., low) level indicate that no gap is detected. After sampling the output of the gap detector 146 in the process block 760, the method next enters a decision block 770 to determine whether the sample is a logical "1" or a logical "0." If a gap is detected (i.e., the sample is a logical "1"), then the gap counter is incremented in a process block 772, and the method then proceeds to a decision block 774. If a gap is not detected (i.e., the sample is a logical "0"), then the method bypasses the process block 772 and enters the decision block 774 without incrementing the gap counter. Within the decision block 774, the sample counter is examined to determine whether it has been incremented to a value of 255 (i.e., whether 255 samples of the output of the gap detector 146 have been taken). If 255 samples have not yet been taken, the method enters a process block 776, wherein the sample counter is incremented, and the method then proceeds back to the process block 760, wherein another sample is taken. This process repeats itself until 255 samples have been taken. Once all 255 samples have been taken, the method enters a decision block 780 wherein the gap counter is examined to determine whether the number recorded is equal to 128 plus or minus a predetermined deviation (for example, in the preferred embodiment, a deviation of ±14). Of course, the gap counter range does not necessarily have to be ±14, as any predetermined value which indicates that the number of samples determined to be at the gap frequency is approximately equal to the number of samples determined not to be at the gap frequency may be employed. Furthermore, as discussed above, a gap/no-gap ratio of approximately one is not required. Rather, the only requirement is that the gap/no-gap ratio be consistent for each sample throughout the entire method.

If the count registered on the gap counter is not within the required predefined boundaries when examined in the decision block 780, the method enters a decision block 790, wherein the gap counter is examined to determine whether the count is greater than the desired count (i.e., 128). If the count is greater than the desired count, then the method enters a process block 792, wherein the read gain value applied to the read gain DAC 212 is decremented by a fixed amount (e.g., a value of one). Returning to the decision block 790, if the register value of the gap counter is less than the desired count, then the method enters a process block 794, wherein the digital read gain value applied to the read gain DAC 212 is incremented by a fixed amount (e.g., one).

Following an increase or decrease of the read gain, as controlled by digital read gain value applied to the read gain DAC 212, the method returns to the process block 750, wherein the gap counter and the sample counter are both reinitialized as described above. The entire cycle is repeated until the total number of counts on the gap counter is determined to be within the required range (e.g., 128±14). When the desired range is achieved, thus indicating that the desired gap/no-gap ratio has been achieved, the method exits the read gain adjustment subroutine 510.

In the read gain adjustment subroutine 510, the output of the gap detector 146 is sampled at a relatively slow rate compared to the frequency at which the output of the gap detector 146 changes. Thus, the sampling is substantially random with respect to the changes. It should be understood that by selecting the gap/no-gap ratio to be approximately equal to one, the magnitude of the output of the post-amplifier 190 (FIG. 1) will be at a magnitude where the threshold detector 220 is operating marginally. That is, although a constant frequency gap signal is sensed by the forward read head 112, the amplitude of output of the post-amplifier 190 will not be sufficiently high to exceed the threshold of the threshold detector 220 for each transition of the gap signal. Thus, the output of the threshold detector 220 will not reproduce each transition of the gap signal, and the gap detector 146 will not detect a continuous gap. By selecting the same gap/no-gap ratio each time the digital read gain value is adjusted, approximately the same magnitude output of the post-amplifier 190 can be obtained. Thus, the digital read gain value will be inversely related to the amplitude of the gap signal recorded on the tape 104, as described above.

In tape drive systems which incorporate multiple write head systems such as the preferred embodiment described herein, one write head may have a different specified peak write head current than the other write head. Thus, it may be necessary to individually calibrate the digital write current value applied to the write current DAC 170 for each of the write heads 110, 114. In such cases, it is advantageous to repeat the method described above for each of the two write heads 110, 114 to obtain an optimum digital write current value for each head. Each digital write current value obtained from the above procedure is stored separately in the EEPROM 156, and the appropriate digital write current value is transmitted to the write current DAC 170 in accordance with the direction of the tape movement.

What is claimed is:

1. A method of selecting an optimum write current applied to a write head of a magnetic tape drive, comprising the steps of:

applying a starting digital write current value to a write current control circuit to cause a write current to be applied to said write head, and, thereafter, sequentially applying a plurality of additional digital write current values to said write current control circuit, and, for each of said starting and additional digital write current values, repeating the steps of:

writing a predetermined pattern of magnetic flux transitions onto a magnetic tape in said magnetic tape drive using said applied write current;

sequentially applying digital read gain values to a digitally controlled read amplifier circuit while sensing said magnetic flux transitions;

monitoring the output of said read amplifier circuit for a predetermined characteristic; and detecting and storing the digital read gain value applied to said read amplifier circuit when said predetermined characteristic is detected; and determining the digital write current value applied to said write current control circuit that corresponds to the smallest of said stored digital read gain values and applying said digital value to said write current control circuit to provide said optimum write current, wherein said starting digital write current value is selected by:

setting said digital write current value to a first digital write current value known to product an actual write current which is substantially less than the saturation current of said write head;

determining a first digital read gain value to correspond to said first digital write current value;

incrementing said digital write current value a predetermined number of steps from said first digital write current value to a second digital write current value;

determining a second digital read gain value to correspond to said second digital write current value;

comparing said first and second digital read gain values to determine if their difference is within a predetermined range; and if said difference between said first and second digital read gain values is within said predetermined range, selecting said first digital write current value as said starting digital write current value; and, if said difference is not within said predetermined range, repeatedly changing said first digital write current value and repeating said steps of determining a first read gain value, incrementing said digital write current said predetermined number of steps, determining a second digital read gain value, and comparing said first digital read gain value and said second digital read gain value until said difference is within said predetermined range.

2. A method of selecting an optimum write current applied to a write head of a magnetic tape drive, comprising the steps of:

applying a starting digital write current value to a write current control circuit to cause a write current to be applied to said write head, and, thereafter, sequentially applying a plurality of additional digital write current values to said write current control circuit, and, for each of said starting and additional digital write current values, repeating the steps of:

writing a predetermined pattern of magnetic flux transitions onto a magnetic tape in said magnetic tape drive using said applied write current;

sequentially applying digital read gain values to a digitally controlled read amplifier circuit while sensing said magnetic flux transitions;

monitoring the output of said read amplifier circuit for a predetermined characteristic; and detecting and storing the digital read gain value applied to said read amplifier circuit when said predetermined characteristic is detected; and determining the digital write current value applied to said write current control circuit that corresponds to the smallest of said stored digital read gain values and applying said digital value to said write current control circuit to provide said optimum write current, wherein said stored digital read gain values are filtered, said filtering comprising the steps of:

setting said digital write current value to a value equal to said starting digital write current value plus $(n-1)/2$, where n is an odd integer;

averaging n digital read gain values centered at said digital write current value;

storing said averaged digital read gain value in an array at an array location indexed by said digital write current value;

incrementing said digital write current value; and repeating said averaging step, said storing step, and said incrementing step until each of said digital read gain values corresponding to each digital write current value has been incorporated into an average at least once.

3. A method of selecting a write current to be applied to the write head of a magnetic tape drive, comprising the steps of:

outputting a first digital write current value to a digital write current control circuit that controls the magnitude of the write current applied to the write head, said first digital write current value selected so that the write current is substantially less than the saturation current of the write head;

outputting a digital read gain value to a digitally controlled read amplifier circuit, said digital read gain value controlling the gain of said read amplifier circuit;

selecting a read gain digital value, said selecting step comprising the steps of:

writing a known pattern onto a magnetic tape in the tape drive to produce flux transitions on said magnetic tape;

sensing said flux transitions and generating electrical signals responsive thereto;

applying said electrical signals as an input to said digitally controlled read amplifier circuit and providing an amplified output signal therefrom;

monitoring said amplified output signal and providing an active pattern detection output signal when said amplified output signal corresponds to said known pattern and an inactive pattern detection output signal when said amplified output signal does not correspond to said known pattern;

sampling said pattern detection output signal a predetermined number of times and counting the number of samples when said pattern detection output signal is active;

adjusting said digital read gain value output to said digital write amplifier circuit until said number of samples when said pattern detection output signal is active is within a predetermined range of numbers; and storing said digital read gain value obtained in said adjusting step;

repeatedly incrementing said digital write current value, and, for each digital write current value, repeating said adjusting and storing steps until said stored digital read gain value reaches a minimum value; and selecting a digital write current value corresponding to a stored digital read gain value representing the minimum gain of said read amplifier circuit, said minimum occurring at the write current that produces the maximum read voltage amplitude.

4. A method of selecting a write current to be applied to the write head of a magnetic tape drive, comprising the steps of:

outputting a sequence of write current digital values to a digital write current control circuit that controls the magnitude of the write current applied to the write head while writing a predetermined pattern onto a tape in said tape drive;

for each of said write current digital values:

outputting a sequence of read gain digital values to a digitally controlled read amplifier circuit, said read gain digital values controlling the gain of said read amplifier circuit;

sensing data from said tape and amplifying said data using said read amplifier circuit to provide a data output signal;

comparing said data output signal with said predetermined pattern and determining a percentage of times that said data output signal corresponds to said predetermined pattern when compared versus a total number of times that said data output signal and said predetermine pattern are compared;

selecting a read gain digital value wherein said percentage is within a predetermined range of percentages; and storing said selected digital read gain value; and selecting a digital write current value corresponding to a stored digital read gain value representing the minimum gain of said read amplifier circuit, said minimum occurring at the write current that provides the maximum read voltage amplitude.

5. An apparatus in a magnetic recording system that optimizes the write current applied to a write head to maximize an output voltage from a read head, comprising:

means for providing first and second digital values;

a digitally controlled write current circuit that receives said first digital value and that outputs a write current to said write head that has a magnitude responsive to said first digital value, said write head producing a pattern of magnetic flux on a magnetic medium which may be subsequently detected by said read head;

a digitally controlled read voltage amplifier circuit that receives said second digital value and that receives an input voltage responsive to said output voltage from said read head, said amplifier amplifying said input voltage by an amount determined by an amplifier gain, said amplifier gain responsive to said second digital value;

a detector which monitors the output of said read voltage amplifier circuit and provides an active output signal when said output corresponds to said predetermined pattern; and means responsive to said output signal from said detector which adjusts said first and second digital values to obtain a write current that maximizes said output voltage form said read head.

* * * * *

UNITED STATES PATENT AND TRADEMARK OFFICE
CERTIFICATE OF CORRECTION

PATENT NO. : 5,172,280
DATED : December 15, 1992
INVENTOR(S) : John J. Quintus, et al It is certified that error appears in the above-indentified patent and that said Letters Patent is hereby corrected as shown below:

At Column 19, Line 15, change "product" to --produce--.

At Column 22, Line 31, change "form" to --from--.

Signed and Sealed this

Sixteenth Day of November, 1993

Attest:

BRUCE LEHMAN

Attesting Officer        Commissioner of Patents and Trademarks